(12) United States Patent
Proscia et al.

(10) Patent No.: US 7,337,875 B2
(45) Date of Patent: Mar. 4, 2008

(54) HIGH ADMITTANCE ACOUSTIC LINER

(75) Inventors: William Proscia, Marlborough, CT (US); Christopher D. Jones, Wethersfield, CT (US); William P. Patrick, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 207 days.

(21) Appl. No.: 10/878,806

(22) Filed: Jun. 28, 2004

(65) Prior Publication Data

US 2005/0284690 A1 Dec. 29, 2005

(51) Int. Cl.
*B64D 33/02* (2006.01)

(52) U.S. Cl. .................. 181/214; 181/210; 181/213; 181/290; 181/292

(58) Field of Classification Search ............... 181/214, 181/210, 213, 290, 292, 293, 294, 296, 229, 181/230, 231, 295, 224, 291; 244/1 N; 428/116, 117, 118
See application file for complete search history.

(56) References Cited

U.S. PATENT DOCUMENTS

| 2,886,121 | A | * | 5/1959 | Welbourn | 181/225 |
| 3,819,009 | A | * | 6/1974 | Motsinger | 181/292 |
| 3,887,031 | A | * | 6/1975 | Wirt | 181/286 |
| 3,910,374 | A | * | 10/1975 | Holehouse | 181/292 |
| 4,034,826 | A | * | 7/1977 | Andrews | 181/224 |
| 4,106,587 | A | * | 8/1978 | Nash et al. | 181/213 |
| 4,135,603 | A | | 1/1979 | Dean, III et al. | 181/286 |
| 4,231,447 | A | * | 11/1980 | Chapman | 181/213 |
| 4,751,979 | A | * | 6/1988 | Wiseman | 181/213 |
| 4,784,583 | A | * | 11/1988 | Bar | 417/312 |
| 4,848,514 | A | | 7/1989 | Snyder | 181/290 |
| 4,858,721 | A | * | 8/1989 | Autie et al. | 181/213 |
| 5,127,602 | A | * | 7/1992 | Batey et al. | 244/1 N |
| 5,209,259 | A | * | 5/1993 | Dear et al. | 137/561 A |
| 5,496,156 | A | * | 3/1996 | Harper et al. | 417/312 |
| 5,581,054 | A | * | 12/1996 | Anderson et al. | 181/213 |
| 5,743,488 | A | * | 4/1998 | Rolston et al. | 244/53 B |

(Continued)

FOREIGN PATENT DOCUMENTS

JP 401226907 A * 9/1989

(Continued)

*Primary Examiner*—Lincoln Donovan
*Assistant Examiner*—Forrest Phillips

(57) ABSTRACT

A cooled acoustic liner useful in a fluid handling duct includes a resonator chamber 52 with a neck 56, a face sheet 86, and a coolant plenum 80 residing between the face sheet and the chamber. Coolant bypasses the resonator chamber, rather than flowing through it, resulting in better acoustic admittance than in liners in which coolant flows through the resonator chamber and neck. In one embodiment, the liner also includes a graze shield 88. Openings 40, 38 penetrate both the face sheet and the shield to establish a relatively low face sheet porosity and a relatively high shield porosity. The shielded embodiment of the invention helps prevent a loss of acoustic admittance due to fluid grazing past the liner. Another embodiment that is not necessarily cooled, includes the resonator chamber, low porosity face sheet and high porosity shield, but no coolant plenum for bypassing coolant around the resonator chamber. An associated method of retrofitting an acoustic treatment into a fluid handling module includes installing openings in the module and mounting a resonator box 44 on the module so that the inlets to the resonator necks register with the installed openings.

16 Claims, 5 Drawing Sheets

U.S. PATENT DOCUMENTS

| | | | | |
|---|---|---|---|---|
| 5,841,079 | A | 11/1998 | Parente | 181/214 |
| 5,923,003 | A * | 7/1999 | Arcas et al. | 181/292 |
| 5,934,611 | A * | 8/1999 | Tindell et al. | 244/53 B |
| 5,997,985 | A * | 12/1999 | Clarke et al. | 428/116 |
| 6,688,558 | B2 | 2/2004 | Breer et al. | 244/134 R |
| 6,896,099 | B2 * | 5/2005 | Porte et al. | 181/214 |
| 6,981,358 | B2 * | 1/2006 | Bellucci et al. | 60/39.17 |
| 2002/0036115 | A1 | 3/2002 | Wilson | 181/292 |
| 2002/0079159 | A1 * | 6/2002 | Liu | 181/210 |

FOREIGN PATENT DOCUMENTS

| | | | | |
|---|---|---|---|---|
| JP | 402071300 | * | 3/1990 | 181/256 |

* cited by examiner

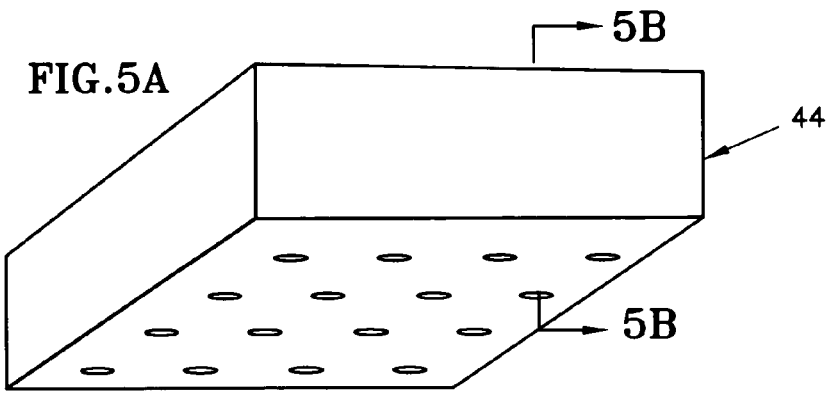
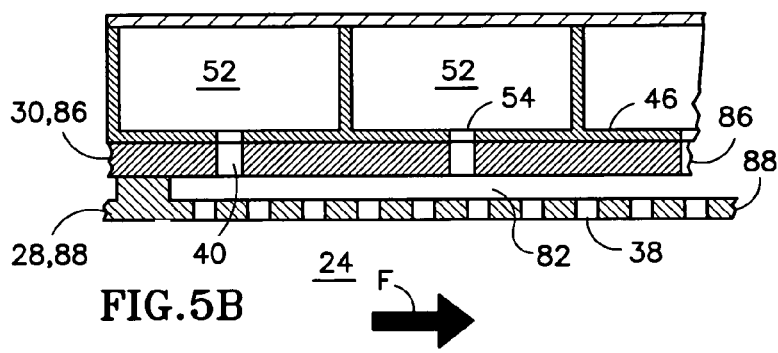
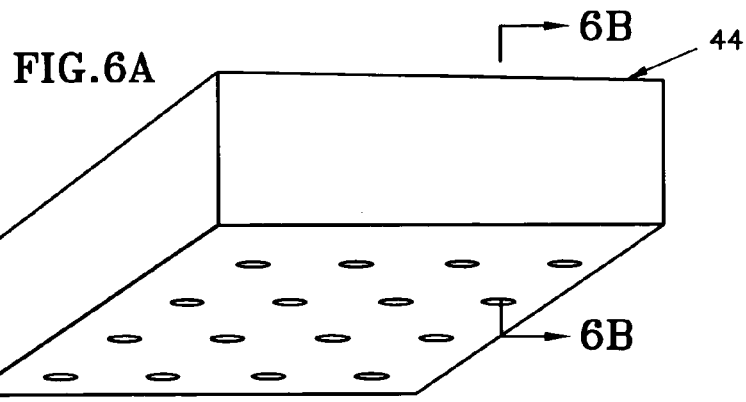
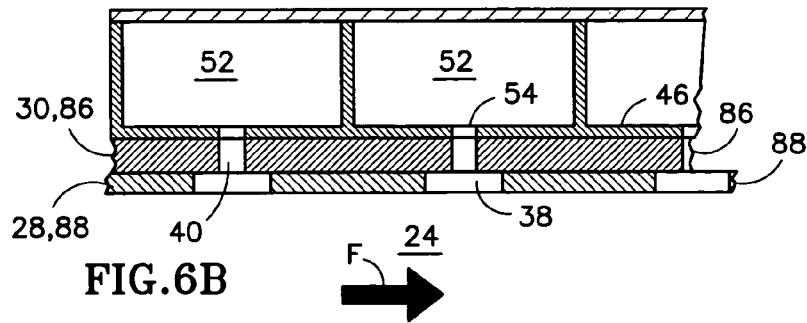

HIGH ADMITTANCE ACOUSTIC LINER

STATEMENT OF GOVERNMENT INTEREST

This invention was made under U.S. Government Contract F33657-99-D-2051-0008. The Government has certain rights in the invention.

TECHNICAL FIELD

This invention relates to acoustic liners and particularly to a liner having a high acoustic admittance for achieving superior noise attenuation.

BACKGROUND OF THE INVENTION

Acoustic liners are used in fluid handling ducts to attenuate undesirable noise associated with a stream of fluid flowing through the duct. Examples of such ducts include the inlet and exhaust system ducts of gas turbine engines. A typical acoustic liner includes a back sheet, a face sheet spaced from the back sheet, and a series of walls that extend between the face sheet and back sheet to define an array of chambers. A set of holes or necks, usually one per chamber, penetrates the face sheet to establish communication between the chamber and the fluid stream. Each chamber and its associated neck is a Helmholtz resonator tuned (i.e. designed) to attenuate a narrow bandwidth of noise frequencies depending on the area and length of the neck, the volume of the chamber, and the local speed of sound. The liner is positioned along the duct wall with the face sheet extending approximately parallel to the direction of fluid flow through the duct.

During operation, the array of resonators attenuates noise attributable to pressure disturbances in the fluid stream. The effectiveness of a resonator in attenuating noise at its design frequency range depends on its ability to admit the disturbance into the chamber, a property referred to as acoustic admittance. Alternatively, the inability of a resonator to receive a disturbance is referred to as acoustic impedance, a complex quantity whose real component is known as resistance.

Despite the many merits of Helmholtz resonator acoustic liners, various factors can degrade their acoustic admittance. For example, when the liner is used to line a fluid handling duct, the flowing fluid grazes past the inlets to the resonator necks and, in doing so, reduces the acoustic admittance of the resonators. This occurs because the grazing fluid produces a region of fluid recirculation inside the neck, which reduces the effective area of the neck, thereby decreasing the acoustic admittance.

Another factor that can degrade acoustic admittance is the flow of coolant through the resonator necks. The use of coolant is often necessary when the duct carries a stream of high temperature fluid, such as the combustion products that flow through a turbine engine exhaust system duct. Cooling is normally accomplished by introducing the coolant (usually relatively cool air) into the resonator chambers through the chamber walls or through the liner back sheet. The coolant then flows out of the chambers by way of the resonator necks. The coolant flowing through the necks reduces the acoustic admittance of the resonator. The loss of acoustic admittance becomes more severe with increasing coolant Mach number.

Specific applications for acoustic liners and specific constraints imposed on their design can present additional challenges. For example, if the need to cool an acoustic liner was not anticipated during the early stages of product design, it can be challenging to retrofit a cooled liner into the product without adversely affecting other attributes of the product. And, irrespective of whether the need for an acoustic liner was appreciated early in product design, the severe space constraints faced by the designer of a gas turbine engines make it inherently difficult to design a liner that attenuates low frequency noise. This is because the design frequency of a Helmholtz is inversely proportional to chamber volume. Hence, large volumes (large amounts of space) are required to attenuate low frequency noise.

SUMMARY OF THE INVENTION

It is, therefore, an object of the invention to provide an acoustic liner that exhibits high acoustic admittance despite the presence of cooling flow.

It is another object of the invention to provide an acoustic liner that exhibits high acoustic admittance despite the presence of grazing flow past the liner.

It is another object to enable an acoustic treatment to be retrofit into a product in which the need for the treatment was not originally anticipated.

It is another object to provide an acoustic liner whose high admittance helps compensate for the difficulty of attenuating low frequency noise in applications where severe constraints are imposed on the volume of the Helmholtz resonator chamber.

According to one embodiment of the invention, an acoustic liner includes a resonator chamber and a face sheet. A coolant plenum resides between the face sheet and the chamber. Coolant bypasses the resonator chamber, rather than flowing through it, resulting in improved acoustic admittance.

In another embodiment, the liner also includes a shield between the face sheet and the noise source. Openings penetrate both the face sheet and the shield to establish a relatively low face sheet porosity and a relatively high shield porosity. The shielded embodiment of the invention helps prevent a reduction of acoustic admittance due to fluid grazing past the liner.

Another embodiment, one that is not necessarily cooled, includes a resonator chamber, a relatively low porosity face sheet and a relatively high porosity shield, but no coolant plenum for bypassing coolant around the resonator chamber.

One form of the invention employs an internally partitioned resonator box with a removeable cap. Tubes projecting from the floor of the box cooperate with opposing rims projecting from the cap to define a set of folded resonator necks. The box offers a convenient way to retrofit an acoustic treatment into an untreated fluid handling duct.

An associated method of retrofitting a duct or similar fluid handling module includes installing openings in the module and mounting a resonator box on the module so that the inlets to the resonator necks register with the installed openings.

These and other embodiments and features of the invention will now be described in more detail in the following description of the best mode for carrying out the invention and the accompanying drawings.

BRIEF DESCRIPTION OF THE DRAWINGS

FIGS. 5A and 5B are a perspective view of a resonator box and a cross sectional side elevation view of an acoustic liner that does not necessarily require cooling.

FIGS. 6A and 6B are an alternative to the embodiment of FIGS. 5A and 5B.

BEST MODE FOR CARRYING OUT THE INVENTION

Figure 1:
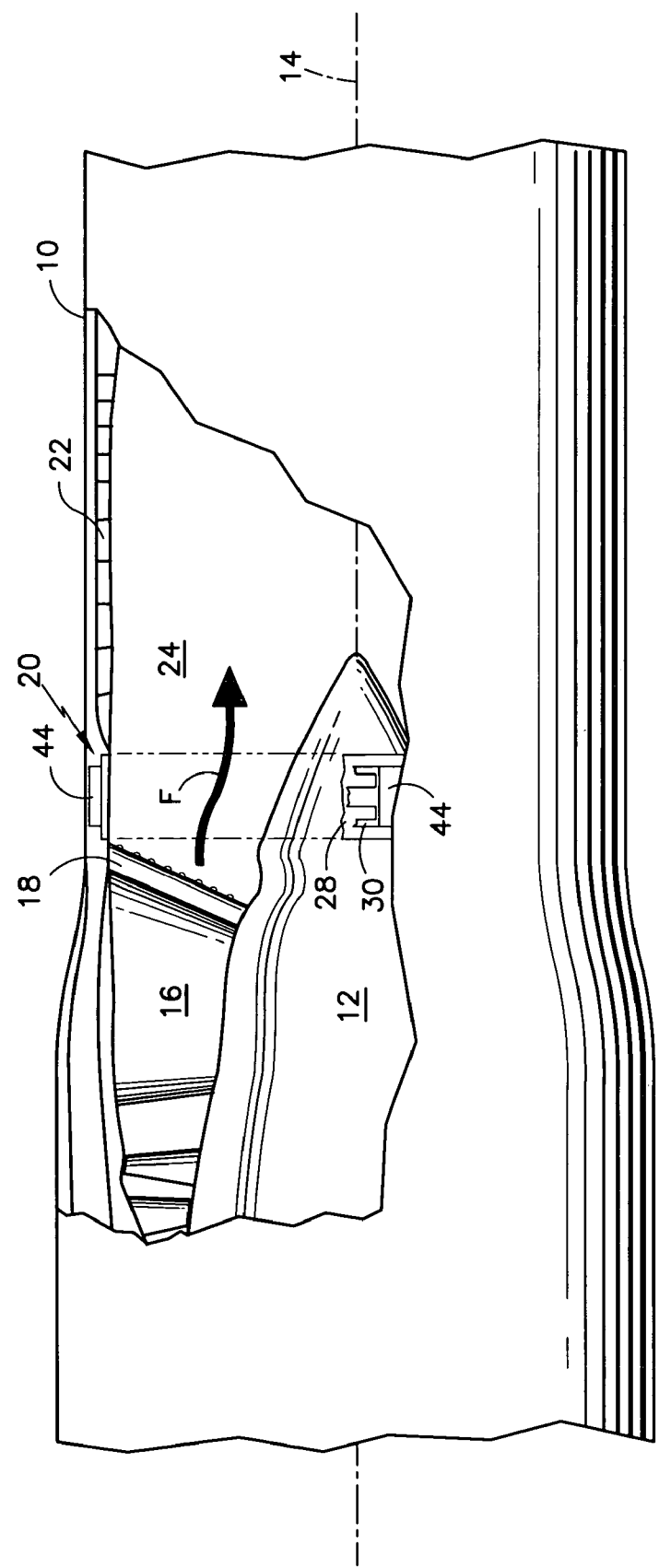
FIG. 1 is a cross sectional side elevation view of the aft end of an afterburning gas turbine engine with the engine casing partially broken away to expose internal components of engine including a modulated exhaust cooling (MEC) module.
Figure 2A:
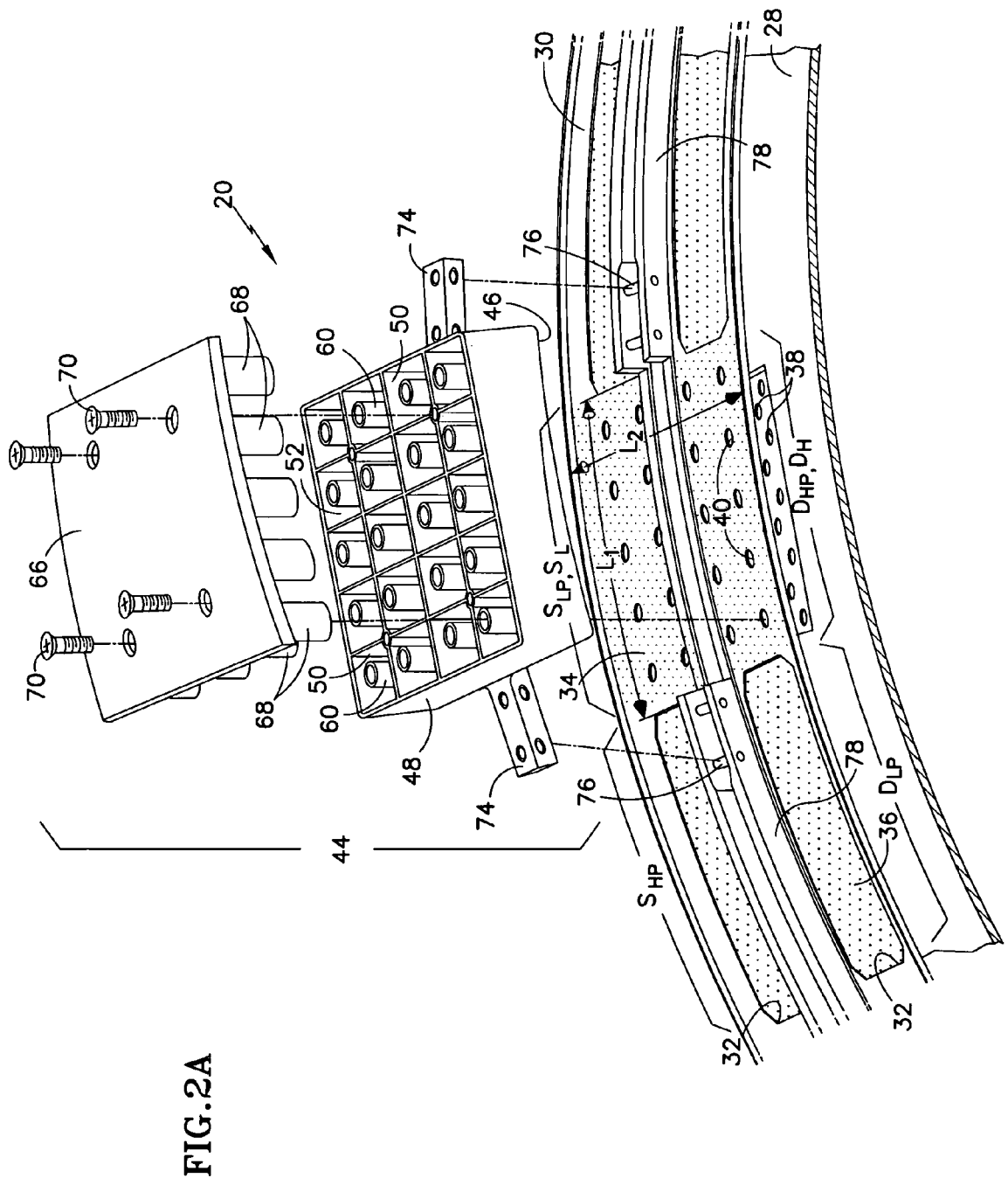
FIG. 2A is an exploded perspective view showing the MEC module of FIG. 1 including an MEC duct, an MEC strap and a resonator box with an array of resonators for a cooled acoustic liner.

Referring to FIGS. 1 and 2A, an afterburning, variable cycle gas turbine engine for a high performance aircraft includes an outer case 10 and an internal centerbody 12 circumscribing an engine axis 14. The engine internal components also include an array of circumferentially distributed turbine exhaust vanes 16, an afterburner flameholder 18 integral with each vane 16, a modulated engine cooling (MEC) module 20, and an afterburner duct 22. A working medium flowpath 24 extends axially along the length of the engine. During engine operation, a fluid stream F comprising hot combustion gases flows through the vane array 16, the MEC module 20, and the afterburner duct 22. When the aircraft pilot selects afterburning operation, the engine fuel system introduces fuel into the combustion gases in the vicinity of the flameholder. The combustion gases ignite the fuel to produce additional thrust.

A pre-existing MEC module 20 includes an MEC duct 28 and an MEC strap 30 encircling the duct. The strap 30 is rotatably mounted on the duct so that actuators, not illustrated, can rotate the strap relative to the duct about axis 14. Various openings penetrate through the MEC strap to define circumferentially alternating regions $S_{HP}$, $S_{LP}$ of high and low strap permeability. Specifically, large windows 32 penetrate the strap in region $S_{HP}$ while numerous coolant passages 34 penetrate the strap in region $S_{LP}$. The openings 40 shown penetrating the strap in regions $S_{LP}$ are not present in the pre-existing MEC strap and hence are not related to its permeability as just described. Various openings also penetrate through the MEC duct 28 to define circumferentially alternating regions $D_{LP}$, $D_{HP}$ of low and high duct permeability. Specifically, numerous coolant passages 36 (visible through the windows 32) penetrate the duct in region $D_{LP}$ while a smaller quantity of larger openings 38 penetrate the duct in region $D_{HP}$.

During engine operation, a control system rotates the MEC strap 30 relative to the MEC duct 28 to align the high and low permeability regions of the strap with the high and low permeability regions respectively of the duct or to align the high and low permeability regions of the strap with the low and high permeability regions respectively of the duct. The alignment or misalignment of the regions of high and low permeability regulates the admission of coolant according to engine requirements and also adjusts the engine bypass ratio to alter the thermodynamic cycle of the engine.

At certain engine operating conditions, use of the afterburner results in a highly undesirable noise signature that originates in the engine flowpath 24. These operating conditions correspond to those where the MEC strap regions $S_{LP}$ are aligned with MEC duct regions $D_{HP}$ as seen in FIG. 2A. The undesirable noise signature may be attenuated by employing an acoustic liner according to an embodiment of the invention described below.

Figure 2B:
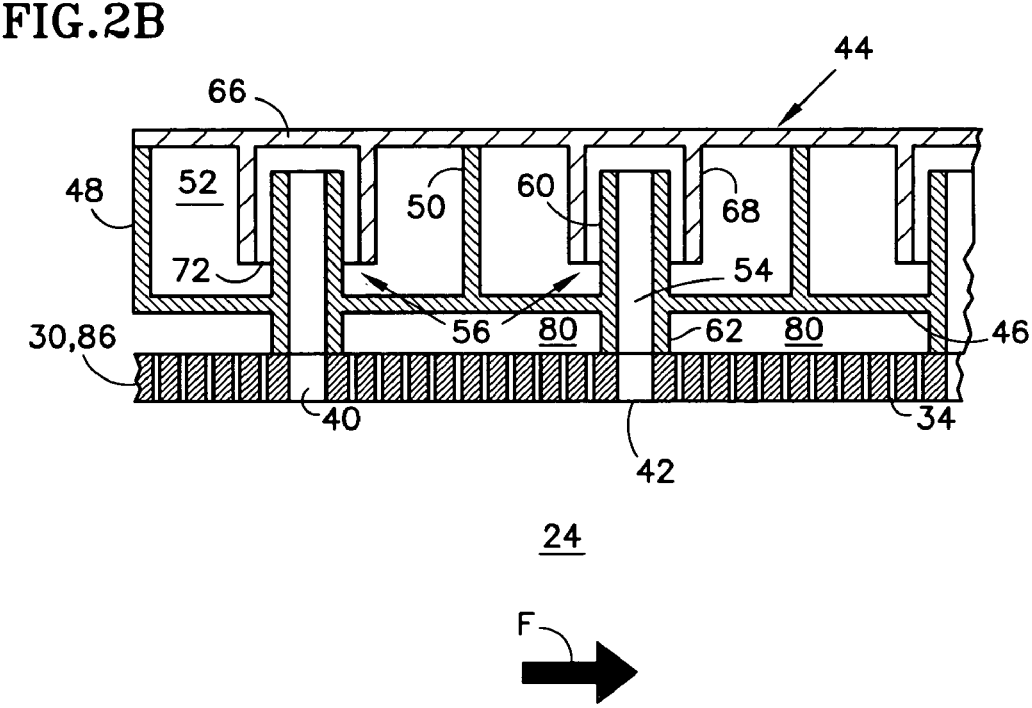
FIG. 2B is a cross sectional side elevation view showing an acoustic liner employing the resonator array and MEC strap but not the MEC duct of FIG. 2A.
Figure 2C:
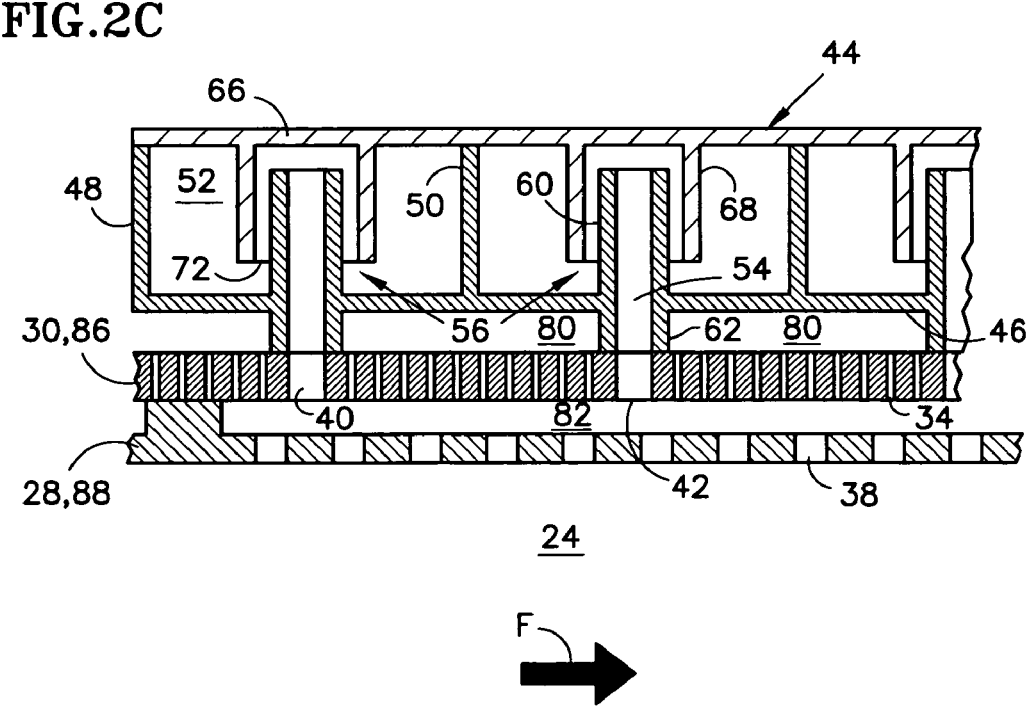
FIG. 2C is a cross sectional side elevation view showing an acoustic liner employing the resonator array, MEC strap and MEC duct of FIG. 2A.

Referring now to FIGS. 2A through 2C, a noise attenuating resonator box 44 includes a floor 46, exterior wall 48 extending from the floor and interior walls 50 also extending from the floor. The walls 48, 50 cooperate with the floor and with each other to define an array of resonator chambers 52. Openings 54 penetrate the floor, one opening per chamber. An internal tube 60 projects from each opening 54 into the interior of the chamber. An external tube 62 projects away from the chamber. The resonator box also includes a removeable cap 66 having rims 68. Screws 70, secure the cap in place. Other means of securing the cap, such as brazing, may also be used. A seal, not illustrated, resides between the cap and the walls 48, 50 to prevent fluid leakage into or out of the box and between the individual chambers 52. When the cap is installed, each rim opposes and circumscribes an internal tube.

The resonator box also includes a pair of circumferentially extending mounting lugs 74. The box is securable to the MEC strap 30 by pins 76 that project through holes in the lugs and are brazed to rails 78 on the strap. The external tubes 62 serve as standoffs to define a coolant plenum 80 between the floor 46 and the MEC strap 30. The end of each tube 62 is brazed to the MEC strap to provide a fluid tight seal.

The openings 40, which are not present in pre-existing MEC straps, are installed in the strap so that when the resonator box is mounted on the strap as just described, the openings 40 register with the external tubes 62. Openings 40 are therefore referred to as resonator openings. Each resonator opening has an inlet 42. In the embodiments of FIGS. 2B and 2C, each opening 40, external tube 62, internal tube 60 and rim 68 define a folded resonator neck 56 having an outlet 72. The resonator neck establishes communication between the chambers 52 and their local environment. Other neck configurations, some of which are described later, may also be used.

Disregarding for the moment the MEC duct 28, the above described assembly defines an acoustic liner, as best seen in FIG. 2B, for attenuating noise generated at a noise source in the engine flowpath 24. The liner comprises a resonator defined by at least one chamber 52 and by MEC strap region $S_{LP}$ which serves as a acoustic liner face sheet 86 residing between the chamber and the noise source. During engine operation, the chamber and its associated neck 56 comprise a Helmholtz resonator that attenuates noise produced at the noise source. In addition, coolant from plenum 80 flows through passages 34 to cool the face sheet 86. Because this coolant completely bypasses the neck 56 rather than flowing through it, the coolant flow does not adversely affect the acoustic admittance of the acoustic liner. Hence the liner is better able to attenuate noise in its design frequency band than would be the case if coolant discharged conventionally through the neck 56. Alternatively, some fraction of the coolant could pass through the chambers and necks, with the balance of the coolant bypassing the resonators as just described. Although the coolant that flows through the neck will degrade the acoustic admittance, the loss of acoustic performance will be less noticeable than if none of the coolant bypassed the resonators.

Referring now to FIGS. 2A and 2C, an alternative embodiment is presented in the context of a turbine engine that includes both the MEC strap 30 (acoustic liner face sheet 86) and the MEC duct 28. As seen best in FIG. 2C, the MEC duct 28 and MEC strap 30 are locally radially offset from each other to define a distribution chamber 82. The MEC duct, as will be explained, serves as a graze shield. The duct regions $D_{HP}$ act as duct regions $D_H$ of relatively high acoustic porosity due to the previously described openings 38. The porosity of region $D_H$ is the aggregate area of openings 38 divided by the area of region $D_H$, which is the product of dimensions $L_1$ and $L_2$. The strap regions $S_{LP}$, which are circumferentially aligned with duct regions $D_H$, act as relatively low acoustic porosity strap regions $S_L$. These low acoustic porosity strap regions $S_L$ are the same regions previously described as low permeability strap regions $S_{LP}$ in the context of supplying coolant and altering engine bypass ratio. However in the context of acoustic performance, the low acoustic porosity of regions $S_L$ results from the resonator openings 40 penetrating the strap 30 (i.e the acoustic liner face sheet 86) not from the passages 34 which are meaningful only in the context of cooling and thermodynamic cycle. Hence, the acoustic porosity of the strap 30 (face sheet 86) is the aggregate inlet area of resonator openings 40 divided by the area of region $S_L$, which is approximately $L_1$ times $L_2$. In other words, the collective area of the passages 34 does not contribute to the acoustic porosity of the face sheet. The porosity of the duct regions $D_H$ exceeds the porosity of the strap regions $S_L$.

During operation, the acoustic damping afforded by the liner is required, and is achieved, when the MEC strap is positioned so that strap region $S_L$ is circumferentially aligned with MEC duct region $D_H$. Coolant flows through passages 34, into distribution chamber 82, and through the openings 38 which exhaust into the flowpath 24. Because the coolant bypasses the Helmholtz resonators rather than flowing through the resonator chambers and necks, its presence does not degrade the acoustic admittance of the liner. The effect of coolant discharging through openings 38 is a low velocity discharge that does not appreciably degrade the acoustic admittance of the liner. The MEC duct regions $D_H$ also help preserve the liner's acoustic admittance by acting as a graze shield between openings 40 and the fluid stream F.

Accordingly, an alternate embodiment of the inventive acoustic liner also includes a shield 88 between the face sheet 86 and the noise source in flowpath 24. The shield is offset from the face sheet to define a distribution chamber 82. The shield has an acoustic porosity attributable to the shield openings 38. The acoustic porosity of the shield is the collective area of openings 38 divided by the total area of region $D_H$, which is approximately $L_1$ times $L_2$. The porosity of the shield exceeds the porosity of the face sheet. The presence of the higher porosity shield limits the loss of acoustic admittance that would normally occur as a result of the combustion gases grazing axially past the face sheet 86. This occurs for two reasons. First, because the face sheet is not exposed to the grazing flow, the region of fluid recirculation produced by the grazing flow occurs at the graze shield openings 38 rather than at the resonator openings 40. Second, due to the higher porosity of the graze shield relative to that of the face sheet, the acoustic velocity fluctuations in the shield are smaller as a result of conservation of mass. Therefore, the acoustic resistance is controlled by the face sheet resistance and is not limited by the graze shield resistance.

In one specific embodiment of the invention of FIGS. 2A and 2C, each resonator opening 40 has a diameter of about 0.170 inches (approximately 4.3 mm) resulting in a face sheet porosity of about 3%. Each shield opening 38 has a diameter of about 0.148 inches (approximately 3.8 mm). Although the shield openings are slightly smaller in diameter than the resonator openings, they are more numerous, resulting in a shield porosity of about 30%. Hence, the ratio of shield porosity to face sheet porosity is about 10:1.

Figure 3A:
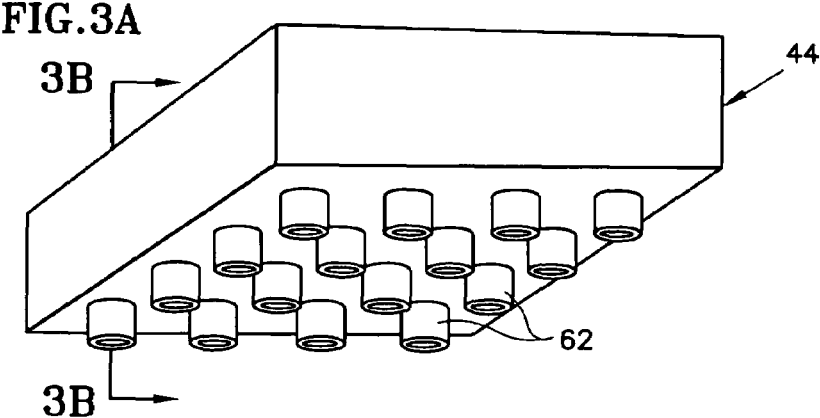
FIGS. 3A and 3B are a perspective view of a resonator box and a cross sectional side elevation view of an alternate embodiment of the inventive acoustic liner.
Figure 3B:
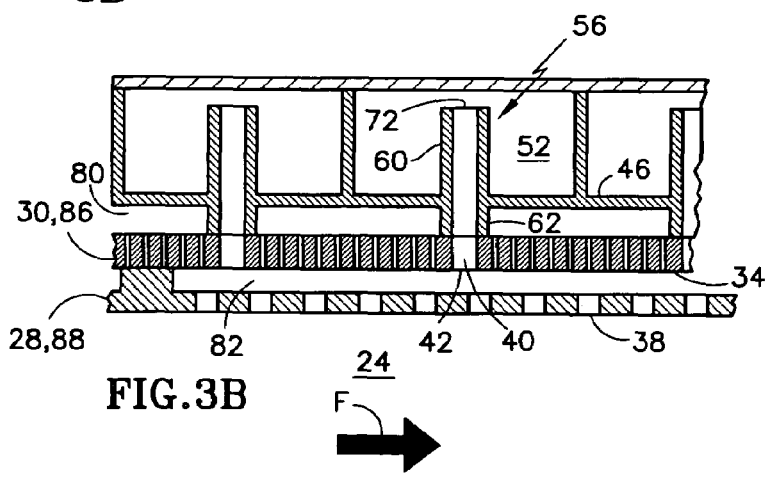
Figure 4A:
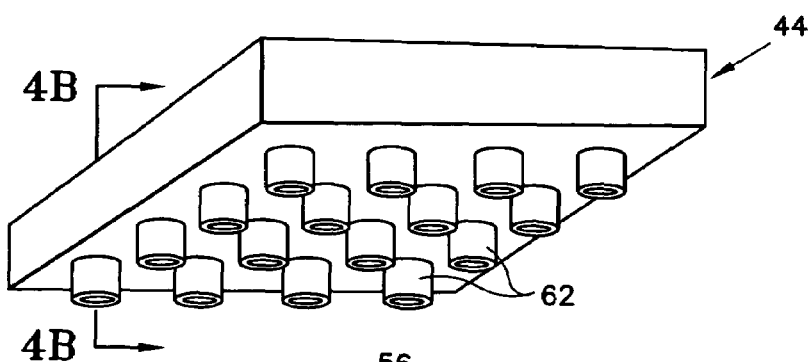
FIGS. 4A and 4B are a perspective view of a resonator box and a cross sectional side elevation view of another alternate embodiment of the inventive acoustic liner.
Figure 4B:
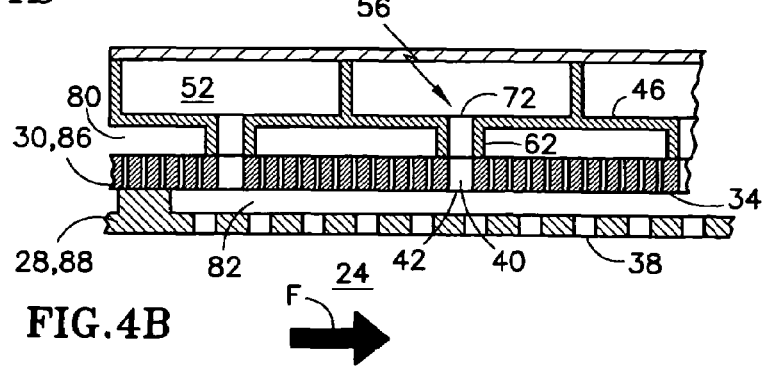

FIGS. 3A and 3B show an acoustic liner with an extended neck 56, rather than the folded neck of FIGS. 2A through 2C. FIGS. 4A and 4B show an embodiment with a simple neck, neither extended nor folded. The designer can use these and other neck variations to tune the liner to a desired frequency band without affecting its external dimensions.

Referring again to FIG. 2A, the resonator box offers a convenient way to retrofit a duct with an acoustic treatment whose desirability may not have been appreciated during the early stages of product design and development. In a pre-existing MEC module the strap includes regions $S_{HP}$ with windows 32, and regions $S_{LP}$ with passages 34, but without resonator openings 40. The MEC duct includes regions $D_{LP}$ with passages 36 and regions $D_{HP}$ with openings 38. Noise attenuation is desired when the regions $S_{LP}$ are circumferentially aligned with regions $D_{HP}$ as depicted in FIG. 2A. To provide the desired noise attenuation it is necessary only to install the resonator openings 40 in strap regions $S_{LP}$, and mount a resonator box in each region $S_{LP}$ so that the necks 56 register with the resonator openings 40.

FIGS. 5A and 5B, show an additional embodiment that is not necessarily cooled. In this embodiment of the acoustic liner, the external tubes 62 of FIGS. 2B, 3B and 4B are absent so that the floor 46 of the resonator box contacts the face sheet 86. From an acoustic standpoint there is no distinction between the floor 46 and the face sheet, and they may be constructed as a single unit. The face sheet resides between resonator chambers 52 and the noise source in flowpath 24. The face sheet has a face sheet porosity attributable to the resonator openings 40. A graze shield 88 resides between the face sheet and the noise source and is spaced from the face sheet to define a distribution chamber 82. The shield has a porosity attributable to shield openings 38. The shield porosity exceeds the face sheet porosity. As a result, the acoustic admittance of the liner is not degraded by the grazing action of the fluid stream F as it flows past the liner.

FIGS. 6A and 6B, show yet another embodiment that is not necessarily cooled. In this embodiment, the shield 88 contacts the face sheet 86 so that there is no distribution chamber such as chamber 82 of FIG. 5B. In addition, the quantity of shield openings 38 equals the quantity of resonator openings 40 and each opening 38, is aligned with an opening 40. Moreover, the diameters of the shield openings are larger than those of the resonator openings so that the shield porosity exceeds the face sheet porosity. In the illustrated embodiment, the diameter ratio is about 3:1, which results in a shield porosity approximately 10 times that of the face sheet porosity. As with the other shielded embodiments, the shield reduces or eliminates fluid recirculation in resonator openings 40. In addition, the high porosity of the shield relative to that of the face sheet reduces the acoustic resistance of openings 38 so that the grazing action of the fluid stream F does not significantly degrade the acoustic admittance of the liner.

Although the embodiments of FIGS. 5 and 6 are not necessarily cooled, cooling can be accomplished, if desired, by introducing coolant into the chambers 52 and exhausting it through openings 38. In such a liner, coolant inlet passages (not illustrated) would penetrate the resonator exterior wall 48 and/or cap 66 to meter coolant into the chambers 52. The coolant would then flow through the resonator chambers 52, and through the illustrated resonator openings 40 and shield openings 38.

The invention has been described in the context of a turbine engine having an MEC strap, an MEC duct and a distinct resonator box. However this is merely one specific arrangement that takes advantage of pre-existing openings 38 in a turbine MEC duct and, with nothing more than a resonator box and the installation of openings 40 in the MEC strap, introduces an acoustic treatment into a previously untreated duct. Moreover, the resulting acoustic treatment has a high acoustic admittance for superior noise attenuation. In general, the disclosed liner is a generic acoustic liner applicable to a wide range of products.

Acoustic liners constructed according to the invention may comprise numerous resonators all tuned to the same frequency. Alternatively, the resonators may be tuned to different frequencies to achieve broadband noise attenuation. Moreover, the liner may be configured so that a cavity communicates with its environment by way of multiple necks.

Although this invention has been shown and described with reference to detailed embodiments thereof, it will be understood by those skilled in the art that various changes in form and detail may be made without departing from the invention as set forth in the accompanying claims.

We claim:

1. A gas turbine engine acoustic liner for attenuating noise generated by working fluid flowing through said gas turbine engine at a noise source, comprising:
    a resonator including a chamber having an opening;
    a face sheet between the chamber and the working fluid, said chamber opening registering with a corresponding opening in said face sheet; and
    a coolant plenum disposed between the face sheet and the chamber, such that fluid communication between said plenum and said chamber opening is blocked to prevent compromising the acoustic admittance of said chamber.

2. The liner of claim 1 comprising:
    a shield between the face sheet and the working fluid;
    resonator openings penetrating the face sheet and establishing a face sheet porosity;
    shield openings penetrating the shield and establishing a shield porosity greater than the face sheet porosity.

3. The liner of claim 2 including a distribution chamber between the face sheet and the shield.

4. The liner of claim 2 wherein the ratio of the shield porosity to the face sheet porosity is about 10:1.

5. The liner of claim 4 wherein the shield porosity is about 30%.

6. The liner of claim 1 or 2 including coolant passages perforating the face sheet.

7. The liner of claim 1 or 2 including a neck that extends into the interior of the chamber.

8. The liner of claim 7 wherein the neck comprises a tube extending into the interior of the chamber.

9. The liner of claim 7 wherein the neck is folded.

10. The liner of claim 9 wherein the folded neck comprises a tube projecting from the resonator opening into the chamber and an opposing rim that circumscribes the tube to define an outlet.

11. The liner of claim 2 wherein the shield is part of a duct and the face sheet is part of a strap mounted on the duct.

12. The liner of claim 11 wherein the strap is movable relative to the duct.

13. A resonator box for a modulated gas turbine engine cooling module, comprising:
    a floor;
    walls extending from the floor and cooperating with the floor and with each other to define an array of chambers;
    resonator necks, each having an inlet and comprised of tubes projecting into the chambers;
    a removable cap having raised rims opposing the tubes so that the rims circumscribe the tubes to define outlets
    wherein the box is retrofittable onto an adjustable cooling air modulation strap in the exhaust nozzle of said gas turbine engine.

14. An acoustic liner for attentating noise generated at a noise source, comprising:
    a resonator including a chamber;
    a face sheet between the chamber and the noise source, the lace sheet having a face sheet porosity; and
    a shield between the face sheet and the noise source, the shield having a porosity greater than the face sheet porosity.

15. The acoustic liner of claim 14 including a distribution chamber between the face sheet and the shield.

16. A method of retrofitting a fluid handling module to improve its noise signature, the module including a rotatable cooling air modulation strap, the method comprising:
    providing a resonator box having resonator inlets;
    installing resonator openings in the strap; and
    mounting the box on the strap so that the inlets register with the resonator openings.

* * * * *